United States Patent [19]

Seltmann et al.

[11] Patent Number: 5,073,588

[45] Date of Patent: Dec. 17, 1991

[54] GLYCIDOXYPROPYL SILANOL AND POLYDIMETHYL SILOXANES AS MOLD RELEASE AGENTS

[75] Inventors: Hans-Guenter Seltmann; Juergen Haerer; Hans-Josef Hoffmann, all of Duesseldorf, Fed. Rep. of Germany

[73] Assignee: Henkel Kommanditgesellschaft auf Aktien, Duesseldorf, Fed. Rep. of Germany

[21] Appl. No.: 238,703

[22] Filed: Aug. 31, 1988

[30] Foreign Application Priority Data

Aug. 31, 1987 [DE] Fed. Rep. of Germany ....... 3729039

[51] Int. Cl.$^5$ ................................................ C08K 5/24
[52] U.S. Cl. ................................ 524/264; 264/331.11; 427/387; 524/265
[58] Field of Search ............... 524/264, 265; 427/387; 264/331.11

[56] References Cited

U.S. PATENT DOCUMENTS

| | | | |
|---|---|---|---|
| 3,485,780 | 12/1969 | Sterman et al. | 260/18 |
| 3,872,038 | 3/1975 | Adams et al. | 260/13 |
| 4,677,160 | 6/1987 | Kondo et al. | 524/860 |

*Primary Examiner*—Melvyn I. Marquis
*Attorney, Agent, or Firm*—Ernest G. Szoke; Wayne C. Jaeschke; Henry E. Millson, Jr.

[57] ABSTRACT

An aqueous solution of suspension of glycidoxypropyl silanol and polydimethyl siloxanes having a number average molecular wieght of more than 100,000 and their use as mold release agents with good release values over a relatively large number of molding cycles in the molding of rubber and plastics.

3 Claims, No Drawings

GLYCIDOXYPROPYL SILANOL AND POLYDIMETHYL SILOXANES AS MOLD RELEASE AGENTS

BACKGROUND OF THE INVENTION

1. Field of the Invention

This invention relates to aqueous solutions or suspensions containing glycidoxypropyl silanol and polydimethyl siloxanes having a number average molecular weight or more than 100,000 as mold release agents for plastics.

2. Statement of Related Art

Various mold release agents containing the following substances are known and are commercially available:
1. water-soluble surfactants;
2. silicone oils containing organic solvents;
3. crosslinkable silicone resins containing organic solvents, and
4. silicone latices.

In addition to certain advantages however, the mold release agents disclosed above also show serious disadvantages. Thus, although they show ready biodegradability and produce a good release effect, the mold release agents of group 1 are stripped from the mold during each release cycle. To produce a thin film on the mold, the mold release agents of group 2 have to be dissolved in organic solvents. Since these solvents are inflammable and since the mold release agents are applied to molds heated to around 160° C., they can only be used in explosion-proof plants. If, on the other hand, non-inflammable halogenated hydrocarbons are used as the solvents, the usual disposal measures have to be taken due to the solvent vapors formed. The mold release agents of group 2 also have to be re-applied after each cycle. In addition, they remain behind on the surfaces of the molding which therefore have to be cleaned before lacquering.

The mold release agents of group 3 have the disadvantages already mentioned due to the presence of solvents in them, although they do remain in place for several molding cycles. Although the mold release agents of group 4 are free from organic solvents, they are also easily stripped so that they often have to be re-applied and, in addition, cause soiling of the mold in practice. Accordingly, there is a need for mold release agents which are free from organic solvents and which do not have to be replaced for at least several molding cycles.

DESCRIPTION OF THE INVENTION

Other than in the operating examples, or where otherwise indicated, all numbers expressing quantities of ingredients or reaction conditions used herein are to be understood as modified in all instances by the term "about".

It has now been found that aqueous emulsions, solutions, or suspensions containing glycidoxypropyl silanol and polydimethyl siloxanes having a number average molecular weight of more than 100,000, which are free from organic solvents, do not have to be replaced until after ten or more molding cycles. Apart from traces of alcohol formed during hydrolysis, the solutions or suspensions to be used in accordance with the invention contain only water as solvent, form a stripping-resistant, effectively releasing film in the mold, which withstands a number of vulcanization cycles, and does not adhere to the surface of the moldings, so that there is no need for cleaning before lacquering or bonding. The molds treated with the mold release compositions of the invention are preferably molds for rubber or plastics.

The present invention also relates to a mold release agent containing 0.5 to 3% by weight glycidoxypropyl silanol and 0.2 to 2% by weight of a silicone latex, the silicone latex containing approximately 25 to 55% by weight of a polydimethyl siloxane having a number average molecular weight of more than 100,000 in aqueous emulsion, in aqueous solution, or in suspension.

The glycidoxypropyl silanol used in accordance with the invention is a known compound which can be obtained by hydrolysis of commercial 3-glycidoxypropyl trimethoxy or triethoxy silane with dilute acids, preferably acetic acid, at pH values of 4 to 4.5. In addition to the glycidoxypropyl silanol, the hydrolysis product may contain other hydrolysis products (through ring opening of the epoxide group) and condensates (through reactions at the silanol group). Silicone latices for use in accordance with the invention are commercially available compounds.

The invention is illustrated but not limited by the following Examples and Comparison Examples.

EXAMPLES

EXAMPLE 1

(a) Preparation of Glycidoxypropyl Silanol:

In a three-necked flask equipped with a stirrer, dropping funnel and reflux condenser, 500 g water were adjusted with dilute acetic acid to a pH value of 4 to 4.5. 15 g glycidoxypropyl triethoxysilane were then added dropwise, the mixture being heated to 90° C. This temperature was maintained for 1 hour.

(b) Preparation of the Release Agent

The cooled silanol solution obtained in step a) was mixed while stirring with 6,5 g of a polydimethyl siloxane latex having the following properties: anionically stabilized emulsion, number average molecular weight of the polydimethyl siloxane above 100,000, content of non-volatile constituents 40% by weight, specific gravity 1.02, pH value 11.2, viscosity 1000 cps. The product is commercially available.

EXAMPLE 2

A mold release agent containing 3% by weight glycidoxypropyl silanol and 1% by weight silicone latex was prepared in the same way as described in Example 1.

EXAMPLE 3

A mold release agent containing 1.3% by weight glycidoxypropyl silanol and 0.22% by weight silicone latex was prepared in the same way as described in Example 1.

The test mold used was a construction comprising an upper circular plate 85 mm in diameter provided with 16 M12 hexagonal screws, a lower circular plate formed with grooves into which the rubber was pressed and a rubber blank arranged between the two circular plates. A rubber mixture having the following composition was used:

| | |
|---|---|
| SBR | 100 parts by weight |
| Stearic acid | 1 part by weight |
| ZnO | 10 parts by weight |
| Antiager | 1 part by weight |
| Paraffin (42–44° C.) | 1 part by weight |
| HAF carbon black | 70 parts by weight |

| -continued | |
|---|---|
| Accelerator | 1 part by weight |
| Sulfur | 0.8 part by weight |

The vulcanization conditions were as follows:

| Vulcanization temperature: | 170° C. |
|---|---|
| Vulcanization time: | 7 minutes |
| Pressure: | 150 bar |

To carry out the release tests, the release agent was sprayed onto the mold described above and baked for 30 minutes at 150° C. The rubber blank was then molded.

The upper and lower circular plates were vertically released in a tensile testing machine. The maximum release values were recorded. Further molding and release cycles were then carried out with no re-application of release agents.

The results obtained with the release agents according to Examples 1 to 3 are shown in the Table at the end of the Examples.

In addition, comparison tests I to VIII were carried out under the conditions described above, the following compositions being tested:

I : without release agent
II : solvent-containing silicone resin (commercially available)
III : 1% surfactant (alkane sulfonate) in water (commercially available)
IV : 1% of the silicone latex used in Example 1
V : 3% of the glycidoxypropyl silanol used in Example 1
VI : 3% hydrolyzed aminoethyl aminopropyl triethoxysilane (commercially available)
VII : 5% Y-aminopropyl triethoxysilane
VIII : 3% hydrolyzed vinyl triethoxysilane Mixtures of the silicone latex of Example 1 with the hydrolyzed silanes of Comparison Examples VI, VII and VIII were not stable and, accordingly, did not produce useful mold release agents.

The results of the comparison tests are also shown in the Table at the end of the Examples.

It can be seen from the Table that the mold release agents of Examples 1 to 3 according to the invention produce an excellent release effect, even in the 10th molding cycle. Compared with the individual components (comparison tests IV and V), highly enhanced effects were obtained with the combinations according to the invention. Finally, the release agents according to the invention have the advantage over Comparison Example II in that they contain no solvents.

TABLE

| | (Release values in N) | | | |
|---|---|---|---|---|
| | 1st release value | 2nd release value | 5th release value | 10th release value |
| Example | | | | |
| 1 | 7 | 6 | 7 | 7 |
| 2 | 12 | 15 | 17 | 20 |
| 3 | 7 | 7 | 8 | 8 |
| Comparison Example | | | | |
| I | 45 | 45 | 45 | 45 |
| II | 9 | 9 | 8.5 | 9 |
| III | 8 | 12 | 20 | 40 |
| IV | 8 | 11 | 15 | 25 |
| V | 40 | 35 | 17 | 15 |
| VI | 16 | 20 | 35 | 45 |
| VII | 45 | 45 | 45 | 45 |
| VIII | 45 | 45 | 45 | 45 |

We claim:

1. A mold release composition substantially free from organic solvents in the form of an aqueous emulsion, solution, or suspension comprising
   A. from about 0.5 to about 3% by weight of glycidoxypropyl silanol, and
   B from about 0.2 to about 2% by weight of an aqueous silicone latex containing from about 25 to about 55% by weight of a polydimethyl siloxane having a number average molecular weight of more than 100,000.

2. A method of coating a mold with a mold release agent comprising applying to the mold the mold release composition of claim 1 and carrying out at least ten molding cycles before reapplying said mold release composition to the mold.

3. The method of claim 2 wherein the mold is a mold for rubber or plastics.

* * * * *